April 23, 1935.  R. D. ACTON  1,999,028
DUAL WHEEL
Filed Sept. 23, 1933
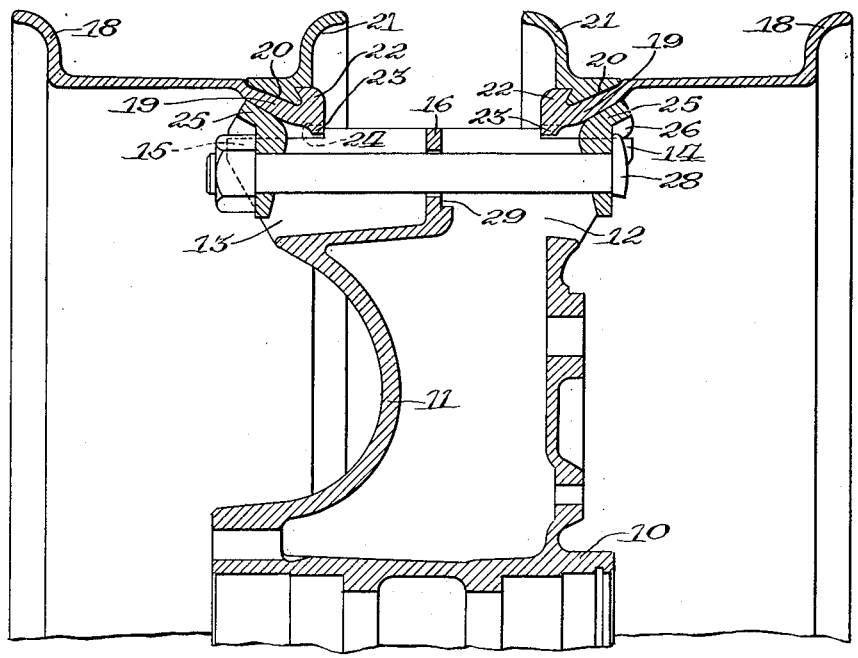
Fig. 1.
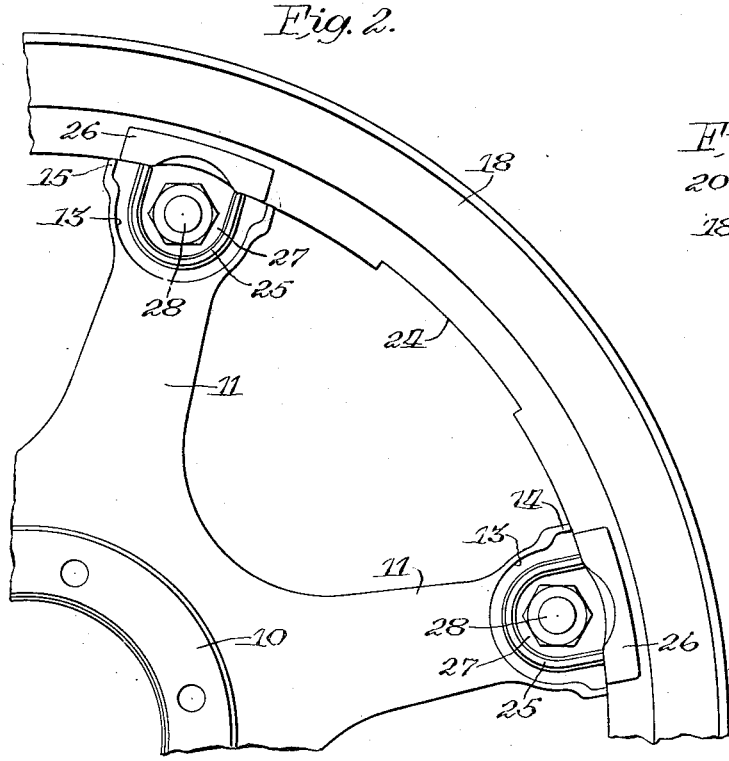
Fig. 2.
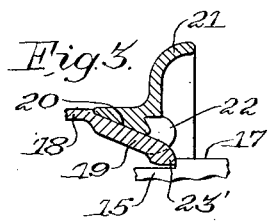
Inventor
Russel D. Acton
By
Atty Patented Apr. 23, 1935

1,999,028

UNITED STATES PATENT OFFICE 1,999,028

DUAL WHEEL

Russel D. Acton, Chicago, Ill.

Application September 23, 1933, Serial No. 690,636

2 Claims. (Cl. 301—12)

This invention relates to dual wheels. More particularly it relates to means for mounting the rims of dual wheels on the spoke ends of felloeless wheels.

In dual wheels of the felloeless type, a pair of rims are mounted directly upon the ends of the spokes by clamping means engaging the rims and holding them against abutments on the spoke ends. Spacing rings of various types have been used. Abutments are formed on the spoke ends either on the in-board side of the wheel,—that is, the side adjacent the vehicle,—or between the two rims. When abutments between the rims are utilized, it becomes necessary to place the inner rim over the abutments when assembling the rims on the wheel. Various means have been provided for permitting the removal and replacement of the in-board rim.

The present invention has for its principal object the provision of a new and improved means for aligning and spacing of the two rims of a dual wheel directly upon the ends of felloeless spokes. Another object is to provide a spacing and aligning means which is positive as to correct alignment and which does not require the use of independent spacing elements. These objects, and others which will be apparent, are accomplished by providing abutments on the ends of the spokes, and spacing and abutting means integral with or permanently secured to the rims. Provision is made for the removal and replacement of the in-board rim by circumferential slots or recesses around the abutting portion of the rim. By provision of such a means, the rim may be first placed over the abutments on the spoke ends and subsequently rotated a sufficient angular distance to bring the abutting means on the rim into operative position with respect to the abutments formed on the spoke ends.

In the drawing:

Figure 1 is a fragmentary cross section of a dual wheel embodying the invention;

Figure 2 is a fragmentary elevational view of the same structure shown in Figure 1;

Figure 3 is a fragmentary sectional view of a modified abutting means; and,

Figure 4 is a fragmentary sectional view of another modified abutting means.

Referring to the drawing, the wheel upon which the dual rims are to be mounted consists preferably of a cast hub 10 having integrally cast spokes 11 radiating therefrom and terminating in spoke ends without the provision of a felloe. The free end of the spokes 11 contain an in-board depression or socket 12 and an out-board socket 13.

It is to be understood that the term in-board is used to designate the side of the wheel adjacent the vehicle,—the term out-board designating the outer side, which is accessible when dismounting or mounting rims. The walls of the spoke adjacent the socket 12 terminate in shouldered portions 14, which lie on a circle concentric with the hub 10. The shoulders 14 are provided to form a seat for the out-board clamping means to be hereinafter described. The walls adjacent the out-board socket 13 terminate in shoulders 15 similar to shoulders 14 and for the same purpose. The in-board socket 12 and the out-board socket 13 are separated by an integral dividing wall 16 located substantially in the median or central plane of the wheel.

The shoulders 14 and 15 terminate in an abutment 17 extending across the top of the spoke end. Said abutments are of a diameter greater than the diameter of the shoulders 14 and 15, forming abutting means as will be hereinafter described.

The rims 18, on which the tires are to be mounted, are of a conventional construction with the exception of the special abutting means provided thereon for the purposes of this invention. Each rim 18 is of a shape rolled to provide a beveled seat 19 adjacent one edge of the rim and interiorly thereof and a gutter 20 immediately above the beveled seat 19. A retaining flange 21 is removably mounted in the gutter 20 for removably securing the tire on the rim. The outside edge portion 22 of the rim is an extension of the portion forming the beveled seat 19 and is shaped to form the outer wall of the gutter 20.

In the particular embodiment of the invention shown in Figures 1 and 2, the edge portion 22 of the rim is specially formed by a rolling operation during manufacture of the rim to provide a radially directed flange 23. Said flange is smaller in its interior diameter than the outside diameter of the abutments 17. Said flange is, however, appreciably less in its interior diameter than the outside diameter of the shoulders 14 and 15. It will be understood that, by so forming the flange 23, it may be moved axially over the shoulders 14 and 15 and abutted against the vertical portions of the abutments 17.

To provide means whereby the in-board rim may be moved axially over the spoke ends into its position, portions or recesses 24 of the flange 23 of a circumferential length greater than the over-all circumferential width of the spoke ends are cut out, as shown in Figure 2 and as also indicated in dotted lines in Figure 1. The recesses 24 have an inside diameter greater than the outside diameter of the abutments 17. To position an in-board rim in position, it is pushed axially over the wheel with the recesses 24 in alignment with the spoke ends. After the rim is moved axially with the flange 23 beyond the abutments 17, the rim may then be rotated angularly about the position shown in Figure 2, whereby the flange 23 may be brought against the abutments 17. The outer rim is then placed in position and the two rims are clamped against the central aligning abutments 17.

Clamps 25 of a conventional construction are provided with end portions 26, which are wedge shaped to engage the seats formed by the shoulders 14 and 15 and the beveled seats 19 formed on the rims. The lugs 25 are also provided with apertured extensions 27 depending into the openings formed by the sockets 12 and 13. Bolts 28 extend through the apertures in the extensions 27 and through aligned openings 29 formed in the integral dividing wall 16. By tightening the bolts 28, the lugs 25 are drawn into position between the shoulders 14 and 15 and the beveled seats 19 on the rims. By this wedging action, the flanges 23 on the rim are drawn against the abutments 17, whereby accurate alignment of the rims is obtained. The radial clearance provided between the flanges 23 and the shoulders 14 and 15 is made as small as practicable, to prevent binding when placing the rims in position, whereby the flanges act as centering means for the rims and prevent any appreciable eccentricity of the rims with respect to the hub.

In Figure 3, a modified form of the invention is shown. In this form, the edge portion 22 of the rim is sheared away and bent down to form the abutting flanges 23'. These flanges are formed and positioned to contact with the abutments 17 in the same manner as the flanges 23, above described. The in-board rim is positioned over the wheel in the same manner by first placing the rim with the flanges 23' between the spoke ends and subsequently rotating the rim into position with the flanges 23' in position to contact the abutments 17.

In the modification of the invention shown in Figure 4, individual spacing elements 29' are permanently secured by welding or other means to the rim 18 in position to contact with the abutments 17. Said elements are of a length sufficient to extend over the spoke ends. The spaces between the elements 29 provide means for mounting the in-board rim.

It is to be understood that applicant has shown and described only certain preferred embodiments of his improved mounting and aligning means for spoke end mounted rims of dual wheels and that he claims as his invention all modifications falling within the scope of the appended claims.

What is claimed is:

1. A wheel structure comprising a wheel body, means integral therewith acting as abutments thereon, said means being spaced circumferentially around the periphery of the wheel, clamp seats formed on each side of said abutments, said seats being less in diameter than the outside diameter of the abutments, rims having beveled clamping seats formed at one edge of the rim, the inside diameter of said beveled seat being slightly larger than the outside diameter of the abutments, rim aligning elements rigidly secured to the rims at the edge of the beveled seat at circumferentially spaced locations whereby both rims may be placed in position from the same side of the rim, said elements having an inside diameter with respect to the wheel axis greater than the clamp seats and less than the abutments, and removable clamps secured on the clamp seats against the beveled seats on the rims.

2. In a dual wheel and in combination, a hub, spokes radially projecting therefrom, an abutment formed on each spoke end, clamp seats formed on each side of said abutments, said seats being less in diameter with respect to the wheel axis than the outside diameter of the abutments, rims having beveled clamping seats formed at one edge of the rim, the inside diameter of said beveled seat being sufficiently larger than the outside diameter of the abutments to freely slide there-over, rim aligning means permanently secured to the rims at the inside edge of the beveled seat at circumferentially spaced locations whereby both rims may be placed in position from the same side of the wheel, and removable clamps secured on the clamp seats against the beveled seats on the rims.

RUSSEL D. ACTON.